US012725598B2

(12) United States Patent
Noguchi et al.

(10) Patent No.: US 12,725,598 B2
(45) Date of Patent: Sep. 1, 2026

(54) MASKING APPARATUS, MASKING METHOD, AND PROGRAM

(71) Applicant: NTT, Inc., Tokyo (JP)

(72) Inventors: Kenichi Noguchi, Tokyo (JP); Kazunori Kobayashi, Tokyo (JP); Hiroaki Ito, Tokyo (JP)

(73) Assignee: NTT, Inc., Tokyo (JP)

( * ) Notice: Subject to any disclaimer, the term of this patent is extended or adjusted under 35 U.S.C. 154(b) by 284 days.

(21) Appl. No.: 18/294,010

(22) PCT Filed: Aug. 6, 2021

(86) PCT No.: PCT/JP2021/029279
§ 371 (c)(1),
(2) Date: Jan. 31, 2024

(87) PCT Pub. No.: WO2023/013020
PCT Pub. Date: Feb. 9, 2023

(65) Prior Publication Data
US 2025/0078796 A1 Mar. 6, 2025

(51) Int. Cl.
*G10K 11/175* (2006.01)
*H04R 1/40* (2006.01)

(52) U.S. Cl.
CPC ............. *G10K 11/175* (2013.01); *H04R 1/40* (2013.01)

(58) Field of Classification Search
CPC . H04R 3/12; H04R 1/40; H04R 1/406; H04R 29/002; H04R 3/005; G10K 11/175
USPC ..................................... 381/73.1, 71.1, 94.1
See application file for complete search history.

(56) References Cited

U.S. PATENT DOCUMENTS

| | | | | |
|---|---|---|---|---|
| 10,157,604 B1 | 12/2018 | Carter | | |
| 2013/0163772 A1* | 6/2013 | Kobayashi | ............... | H04K 3/43 381/71.1 |
| 2013/0170655 A1* | 7/2013 | Satoyoshi | ................ | H04K 3/84 381/59 |

(Continued)

FOREIGN PATENT DOCUMENTS

| | | |
|---|---|---|
| JP | 2009267799 A | 11/2009 |
| JP | 2012080514 A | 4/2012 |
| JP | 2012093705 A | 5/2012 |

*Primary Examiner* — Norman Yu

(57) ABSTRACT

A masking technology is provided for curbing discomfort at the time of a change in a masking sound by presenting a video corresponding to the masking sound at the time of the change in the masking sound. A masking device includes: a spoken voice volume evaluation unit configured to generate an evaluation value for a volume of a spoken voice (hereinafter referred to as a spoken voice volume evaluation value) from a spoken voice signal by using, as the spoken voice signal, a sound collection signal output by a microphone installed for collecting the spoken voice which is a voice of a speaking person; a masking sound signal generation unit configured to generate a signal for emitting a masking sound from a speaker (hereinafter referred to as a masking sound signal) corresponding to the spoken voice volume evaluation value, the masking sound preventing the spoken voice from being heard by surrounding persons other than the speaking person; and a masking video signal generation unit configured to generate a signal for presenting a video corresponding to the masking sound (hereinafter referred to as a masking video signal) from a video presentation device.

9 Claims, 9 Drawing Sheets

(56) References Cited

U.S. PATENT DOCUMENTS

| | | | | |
|---|---|---|---|---|
| 2016/0080537 | A1* | 3/2016 | Kim | H04R 3/00 455/550.1 |
| 2018/0151168 | A1* | 5/2018 | Benway | G10K 11/1752 |
| 2021/0104222 | A1* | 4/2021 | Laroche | G10L 13/027 |

* cited by examiner

MASKING APPARATUS, MASKING METHOD, AND PROGRAM

CROSS-REFERENCE TO RELATED APPLICATIONS

This application is a U.S. 371 Application of International Patent Application No. PCT/JP2021/029279, filed on 6 Aug. 2021, the disclosure of which is hereby incorporated herein by reference in its entirety.

TECHNICAL FIELD

The present invention relates to an acoustic signal processing technology for preventing a voice of a speaking person from bothering surrounding people.

BACKGROUND ART

As an acoustic signal processing technology for preventing a voice of a speaking person from bothering surrounding people, there is a technology described in PTL 1. According to the technology described in PTL 1, a interfering sound (hereinafter referred to as a masking sound) for masking a voice of a distant speaker reproduced from a speaker so that surrounding people cannot hear the voice is used to prevent the voice from leaking to the surroundings and, in addition, the masking sound is prevented from being excessively loud and bothering the surrounding people.

CITATION LIST

Patent Literature

[PTL 1] Japanese Patent Application Laid-open No. 2009-267799

SUMMARY OF INVENTION

Technical Problem

According to the technology disclosed in PTL 1, since only the volume of the masking sound is adjusted when reproduction of a masking sound is controlled, the masking sound may be perceiving as being unnatural when the volume is changed.

Accordingly, an object of the present invention is to provide a masking technology for curbing discomfort at the time of change in a masking sound by presenting a video corresponding to the masking sound at the time of change in the masking sound.

Solution to Problem

According to an aspect of the present invention, a masking device includes: a spoken voice volume evaluation unit configured to generate an evaluation value for a volume of a spoken voice (hereinafter referred to as a spoken voice volume evaluation value) from a spoken voice signal by using, as the spoken voice signal, a sound collection signal output by a microphone installed for collecting the spoken voice which is a voice of a speaking person; a masking sound signal generation unit configured to generate a signal for emitting a masking sound from a speaker (hereinafter referred to as a masking sound signal) corresponding to the spoken voice volume evaluation value, the masking sound preventing the spoken voice from being heard by surrounding persons other than the speaking person; and a masking video signal generation unit configured to generate a signal for presenting a video corresponding to the masking sound (hereinafter referred to as a masking video signal) from a video presentation device.

According to another aspect of the present invention, a masking device includes: a microphone array processing unit configured to generate an integrated sound collection signal from N (where N is an integer of 2 or more) sound collection signals output by a microphone array including N microphones installed for collecting a spoken voice that is a voice of a speaking person and to set the integrated sound collection signal as a spoken voice signal; a spoken voice volume evaluation unit configured to generate an evaluation value for a volume of the spoken voice (hereinafter referred to as a spoken voice volume evaluation value) from the spoken voice signal; a masking sound signal generation unit configured to generate a signal for emitting a masking sound (hereinafter referred to as a masking sound signal) corresponding to the spoken voice volume evaluation value from a speaker array including M (where M is an integer of 2 or more) speakers, the masking sound preventing the spoken voice from being heard by surrounding persons other than the speaking person; a masking video signal generation unit configured to generate a signal for presenting a video corresponding to the masking sound (hereinafter referred to as a masking video signal) from a video presentation device; and a speaker array processing unit configured to generate M individual masking sound signals for emitting sound from the speakers included in the speaker array from the masking sound signal.

Advantageous Effects of Invention

According to the present invention, it is possible to curb discomfort at the time of a change in a masking sound by presenting a video corresponding to the masking sound at the time of the change in the masking sound.

DESCRIPTION OF EMBODIMENTS

Hereinafter, embodiments of the present invention will be described in detail. Note that components having the same function are denoted by the same number and redundant description thereof is omitted.

A notation method used in this specification will be described before the embodiments are described.

^ (caret) indicates a superscript. For example, $x^{y\hat{}z}$ means that $y^z$ is a superscript to x and $x^{y\hat{}z}$ means that $y^z$ is a subscript to x. _ (underscore) indicates a subscript. For example, $x^{y\_z}$ means that $y_z$ is a superscript to x and $x_{y\_z}$ means that $y_z$ is a subscript to x.

Superscripts "^" and "~" as in ^x and ~x for a certain character x are normally written directly above "x," but are written as ^x or ~x here due to restrictions on notation in the specification.

First Embodiment

Figure 1:
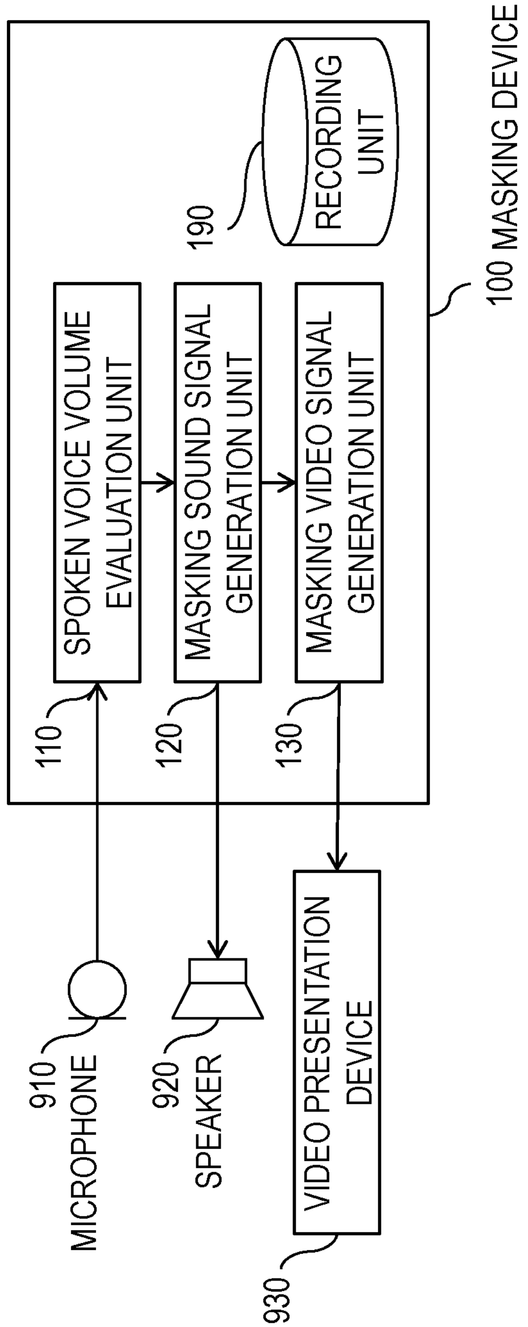
FIG. 1 is a block diagram illustrating a configuration of a masking device 100.
Figure 2:
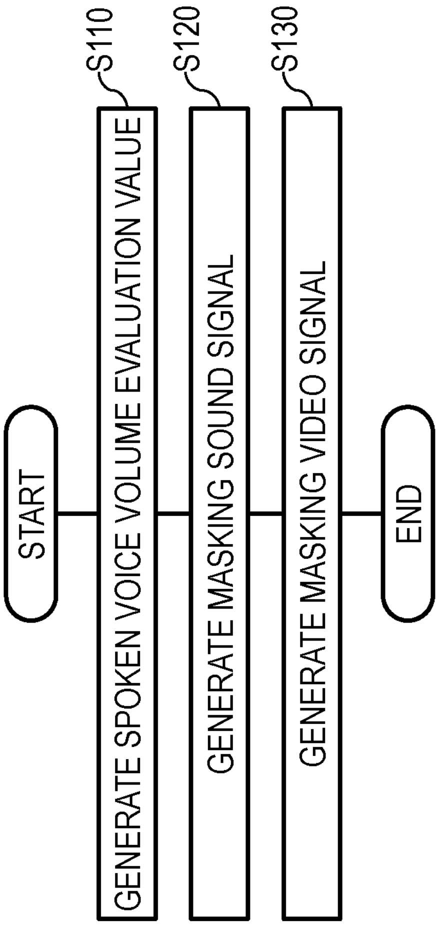
FIG. 2 is a flowchart illustrating an operation of the masking device 100.

Hereinafter, a masking device 100 will be described with reference to FIGS. 1 and 2. FIG. 1 is a block diagram illustrating a configuration of the masking device 100. FIG. 2 is a flowchart illustrating an operation of the masking device 100. As illustrated in FIG. 1, the masking device 100 includes a spoken voice volume evaluation unit 110, a masking sound signal generation unit 120, a masking video signal generation unit 130, and a recording unit 190. The recording unit 190 is a constituent unit that appropriately records information necessary for processing of the masking device 100. The masking device 100 is connected to a microphone 910, a speaker 920, and a video presentation device 930. The microphone 910 is installed to collect a spoken voice which is a voice of a speaking person. The speaker 920 is installed to emit a masking sound which prevents the spoken voice from being heard by surrounding people other than the speaking person. The video presentation device 930 is installed to present a video corresponding to the masking sound emitted by the speaker 920 and may be, for example, a display or a projector.

An operation of the masking device 100 will be described with reference to FIG. 2.

In S110, the spoken voice volume evaluation unit 110 inputs a sound collection signal output by the microphone 910 as a spoken voice signal, and generates and outputs an evaluation value for a volume of the spoken voice (hereinafter referred to as a spoken voice volume evaluation value) from the spoken voice signal. The spoken voice volume evaluation unit 110 generates a spoken voice volume evaluation value by comparing power of the spoken voice signal with a predetermined threshold, for example. The spoken voice volume evaluation unit 110 may detect a spoken voice section or suppress noise when the power of the spoken voice signal is calculated. The spoken voice volume evaluation value may be a value indicating that a spoken voice volume is high, a value indicating that a spoken voice volume is low, or the like.

In S120, the masking sound signal generation unit 120 inputs the spoken voice volume evaluation value generated in S110, and generates and outputs a signal for emitting a masking sound from the speaker 920 (hereinafter referred to as a masking sound signal) corresponding to the spoken voice volume evaluation value. The masking sound signal generation unit 120 may generate a signal of a sound (for example, a sound of a forest) in which a volume of the masking sound is small when the spoken voice volume evaluation value is a value indicating that the spoken voice volume is small or may generate a signal of a sound (for example, a waterfall sound) in which a volume of the masking sound is large when the spoken voice volume evaluation value is a value indicating that the spoken voice volume is large.

In S130, the masking video signal generation unit 130 generates and outputs a signal of a video corresponding to the masking sound corresponding to the masking sound signal generated in S120 (hereinafter referred to as a masking video signal). The masking video signal generation unit 130 receives, for example, meta-information of the masking sound signal generated in S120 as an input and selects a masking video signal using the meta-information. For example, if the meta-information indicates a sound of a forest, a signal of a video of the forest may be used as a masking video signal. If the meta-information indicates a sound of a waterfall, a signal of a video of the waterfall may be used as a masking video signal.

According to the embodiment of the present invention, by presenting a video corresponding to the masking sound at the time of a change in the masking sound, it is possible to curb discomfort at the time of the change in the masking sound. Accordingly, even when discomfort occurs when the masking sound is switched simply by changing a volume and a kind of masking sound, discomfort can be curbed. For example, when the sound of a forest is changed to the sound of a waterfall, even if discomfort occurs to the degree that it is difficult to determine what kinds of sound there are, discomfort can be curbed.

Second Embodiment

Figure 3:
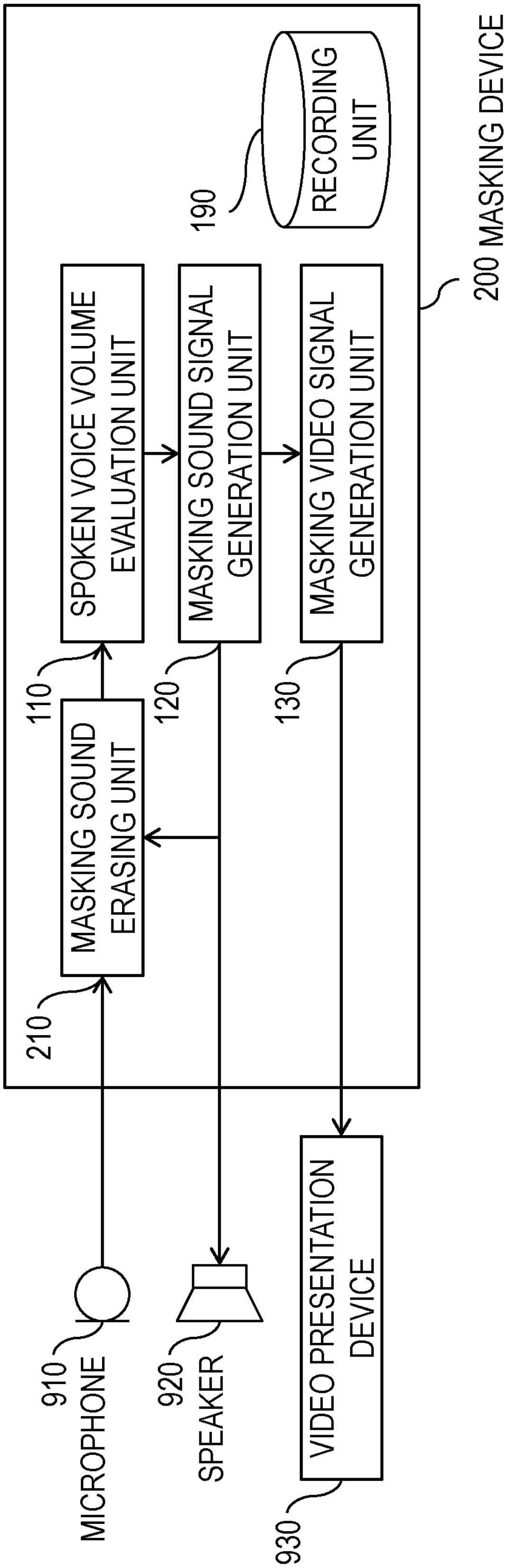
FIG. 3 is a block diagram illustrating a configuration of a masking device 200.
Figure 4:
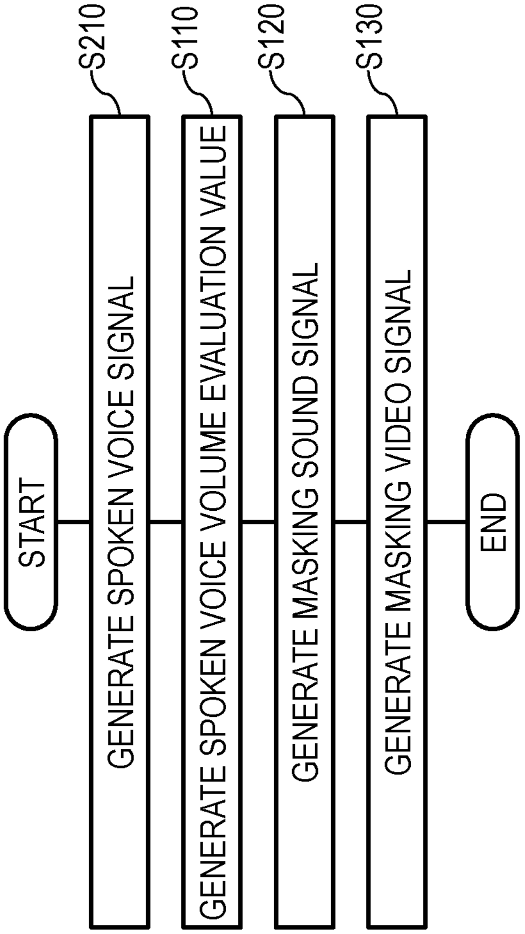
FIG. 4 is a flowchart illustrating an operation of the masking device 200.

Hereinafter, a masking device 200 will be described with reference to FIGS. 3 and 4. FIG. 3 is a block diagram illustrating a configuration of the masking device 200. FIG. 4 is a flowchart illustrating an operation of the masking device 200. As illustrated in FIG. 3, the masking device 200 includes a masking sound erasing unit 210, a spoken voice volume evaluation unit 110, a masking sound signal generation unit 120, a masking video signal generation unit 130, and a recording unit 190. The recording unit 190 is a constituent unit for appropriately recording information necessary for processing of the masking device 200. The masking device 200 is connected to the microphone 910, the speaker 920, and the video presentation device 930. The masking device 200 is different from the masking device 100 in that the masking sound erasing unit 210 is included.

An operation of the masking device 200 will be described with reference to FIG. 4. Here, only an operation of the masking sound erasing unit 210 will be described.

In S210, the masking sound erasing unit 210 receives the sound collection signal output by the microphone 910 and the masking sound signal generated in S120 as an input, generates a signal in which a component caused by the masking sound included in the sound collection signal is erased by using the sound collection signal and the masking sound signal, and outputs this signal as a spoken voice signal. The masking sound erasing unit 210 generates a signal in which a component caused by the masking sound included in the sound collection signal is erased by subtracting a signal generated by convoluting an estimated transfer characteristic from the speaker 920 to the microphone 910 with the masking sound signal from the sound collection signal, and filtering the signal.

According to an embodiment of the present invention, by presenting a video corresponding to the masking sound at the time of a change in the masking sound, it is possible to curb discomfort at the time of the change in the masking sound. By erasing the component caused by the masking sound included in the sound collection signal, it is possible to prevent the masking sound from being mixed and transmitted as unnecessary noise to a call partner, for example, when the speaking person speaks using the microphone 910. Further, it is possible to generate the spoken voice volume evaluation value without being affected by the masking sound.

Third Embodiment

Figure 5:
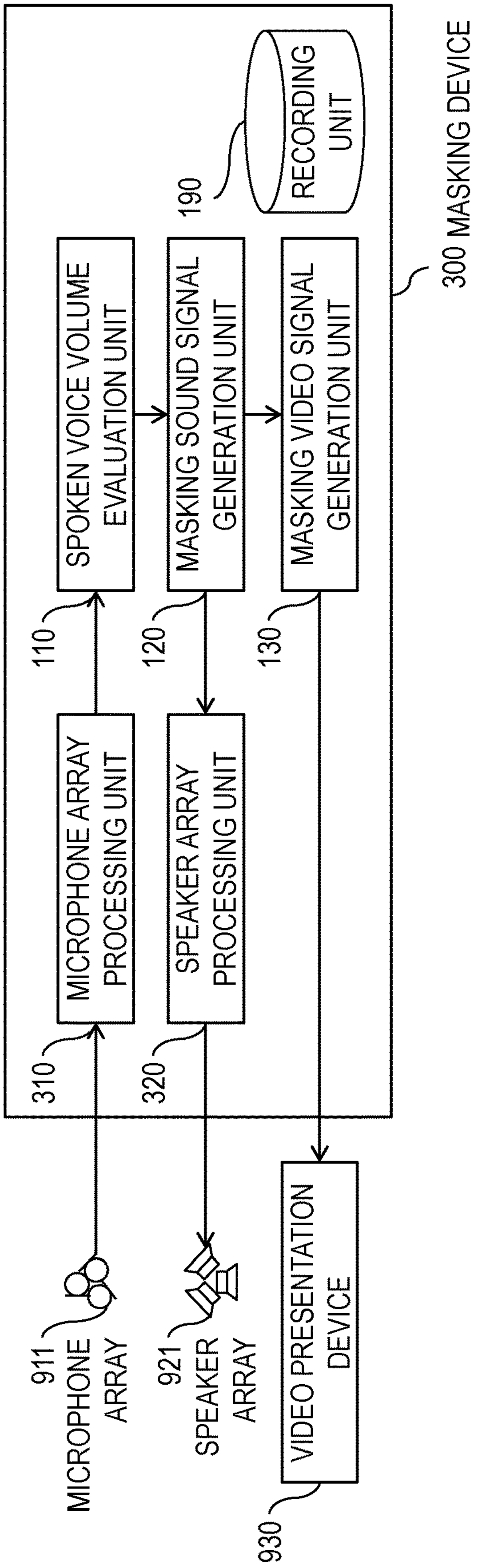
FIG. 5 is a block diagram illustrating a configuration of a masking device 300.
Figure 6:
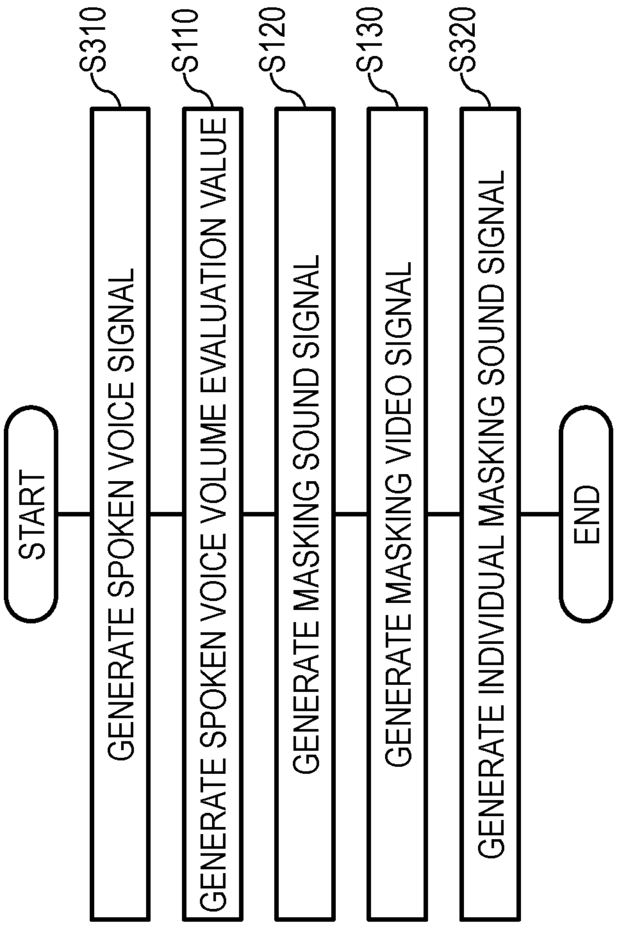
FIG. 6 is a flowchart illustrating an operation of the masking device 300.

A masking device 300 will be described below with reference to FIG. 5 and FIG. 6. FIG. 5 is a block diagram illustrating a configuration of the masking device 300. FIG. 6 is a flowchart illustrating an operation of the masking device 300. As illustrated in FIG. 5, the masking device 300 includes a microphone array processing unit 310, the spoken voice volume evaluation unit 110, the masking sound signal generation unit 120, the masking video signal generation unit 130, a speaker array processing unit 320, and the recording unit 190. The recording unit 190 is a constituent unit that appropriately records information necessary for processing of the masking device 300. The masking device 300 is connected to a microphone array 911 including N (where N is an integer of 2 or more) microphones, a speaker array 921 including M (where M is an integer of 2 or more) speakers, and the video presentation device 930. The microphone array 911 is installed to collect a spoken voice which is a voice of a speaking person. The speaker array 921 is installed to emit a masking sound that prevents the spoken voice from being heard by surrounding people other than the speaking person. The video presentation device 930 is installed to present a video corresponding to the masking sound emitted by the speaker array 921. The masking device 300 is different from the masking device 100 in that the microphone array processing unit 310 and the speaker array processing unit 320 are included.

An operation of the masking device 300 will be described with reference to FIG. 6. Here, only operations of the microphone array processing unit 310 and the speaker array processing unit 320 will be described.

In S310, the microphone array processing unit 310 receives N sound collection signals output by N microphones included in the microphone array 911 as an input, generates an integrated sound collection signal from the N sound collection signals, and outputs the integrated sound collection signal as a spoken voice signal. The microphone array processing unit 310 generates the integrated sound collection signal by forming, for example, directivity in a direction of the speaking person, and a dead angle in a direction of surrounding persons other than the speaking person or in the direction of the speakers included in the speaker array 921 by using predetermined signal processing.

When information regarding positions of a speaking person, surrounding people other than the speaking person, the microphones included in the microphone array 911, and the speakers included in the speaker array 921 is obtained, the microphone array processing unit 310 may adjust gains of the microphones so that, of the microphones included in the microphone array 911, gains of the microphones at a position close to the speaking person are large and gains of the microphones close to the surrounding people other than the speaking person or the speakers included in the speaker array 921 are small. The information regarding positions of the speaking person, the surrounding people other than the speaking person, the microphones included in the microphone array 911, and the speakers included in the speaker array 921 may be obtained from, for example, a system (not illustrated) estimating a position from a video captured by a camera. When the information regarding the positions is obtained in advance, the information may be used.

In S320, the speaker array processing unit 320 receives the masking sound signal generated in S120 as an input, generates M individual masking sound signals for emitting a sound from the speakers included in the speaker array 921 from the masking sound signal and outputs the M individual masking sound signals. The speaker array processing unit 320 generates the M individual masking sound signals, for example, through predetermined signal processing to form directivity in the direction of the surrounding people other than the speaking person and a dead angle in the direction of the speaking person and the direction of the microphones included in the microphone array 911. The directions of the speaking person, the surrounding people other than the speaking person, and the microphones included in the microphone array 911 may be obtained using any method. For example, the directions of the speaking person and the surrounding people other than the speaking person can be obtained through sound source direction estimation by the microphone array processing unit 310.

When information regarding the positions of the speaking person, the surrounding people other than the speaking person, the microphone included in the microphone array 911, and the speakers included in the speaker array 921 is obtained, the speaker array processing unit 320 may adjust gains of the speakers so that, of the speakers included in the speaker array 921, gains of the speakers at a position close to the speaking person are large and gains of the speakers close to the surrounding people other than the speaking person or the microphones included in the microphone array 911 are small. Information regarding positions of the speaking person, the surrounding people other than the speaking person, the microphones included in the microphone array 911, and the speakers included in the speaker array 921 may be obtained from a system (not illustrated) estimating a position from a video captured by a camera. When the information regarding the positions is obtained in advance, the information may be used.

Of the M individual masking sound signals, an individual masking sound signal directed to the direction of the speaking person and an individual masking sound signal directed to the direction of the surrounding people other than the speaking person may each be a signal such that the higher the spoken voice volume evaluation value indicates, the greater the sound emitted by the signal is.

According to an embodiment of the present invention, by presenting a video corresponding to the masking sound at the time of a change in the masking sound, it is possible to curb discomfort at the time of the change in the masking sound.

By controlling the directivity using the microphone array processing unit 310 and the speaker array processing unit 320, it is possible to prevent the masking sound from being enlarged near the speaking person, and prevent the speaking person from speaking with a larger volume by a long-bird effect.

Fourth Embodiment

Figure 7:
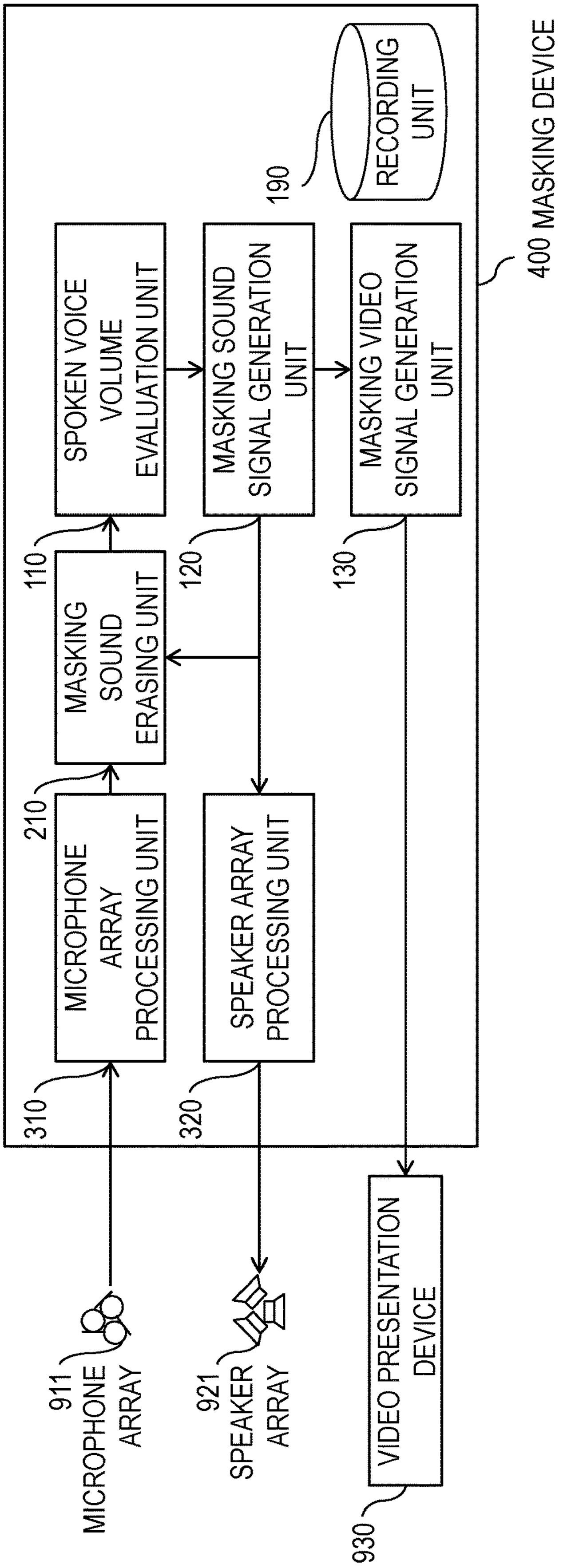
FIG. 7 is a block diagram illustrating a configuration of a masking device 400.
Figure 8:
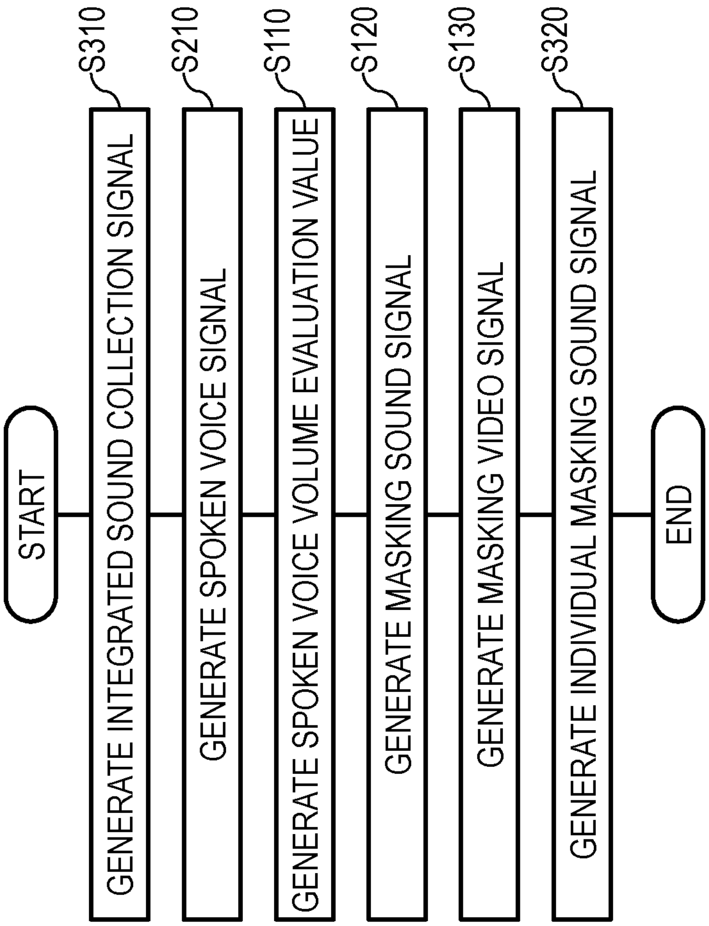
FIG. 8 is a flowchart illustrating an operation of the masking device 400.

Hereinafter, a masking device 400 will be described below with reference to FIG. 7 and FIG. 8. FIG. 7 is a block diagram illustrating a configuration of the masking device 400. FIG. 8 is a flowchart illustrating an operation of the masking device 400. As illustrated in FIG. 7, the masking device 400 includes the microphone array processing unit 310, the masking sound erasing unit 210, the spoken voice volume evaluation unit 110, the masking sound signal generation unit 120, the masking video signal generation unit 130, the speaker array processing unit 320, and the recording unit 190. The recording unit 190 is a constituent unit that appropriately records information necessary for processing of the masking device 400. The masking device 400 is connected to the microphone array 911 including N (where N is an integer of 2 or more) microphones, the speaker array 921 including M (where M is an integer of 2 or more) speakers, and the video presentation device 930. The masking device 400 is different from the masking device 300 in that the masking sound erasing unit 210 is included.

An operation of the masking device 400 will be described with reference to FIG. 8. Here, only an operation of the masking sound erasing unit 210 will be described.

In S210, the masking sound erasing unit 210 receives the integrated sound collection signal generated in S310 and the masking sound signal generated in S120 as an input, generates a signal in which a component caused by the masking sound included in the integrated sound collection signal is erased by using the integrated sound collection signal and the masking sound signal, and outputs the signal as a spoken voice signal.

According to the embodiment of the present invention, by presenting a video corresponding to the masking sound at the time of a change in the masking sound, it is possible to curb discomfort at the time of the change in the masking sound. By erasing a component caused by the masking sound included in the integrated sound collection signal, for example, it is possible to prevent the masking sound from being mixed and transmitted as unnecessary noise to a call partner, for example, when the speaking person speaks using the microphone. Further, it is possible to generate the spoken voice volume evaluation value without being affected by the masking sound.

<Supplements>

Figure 9:
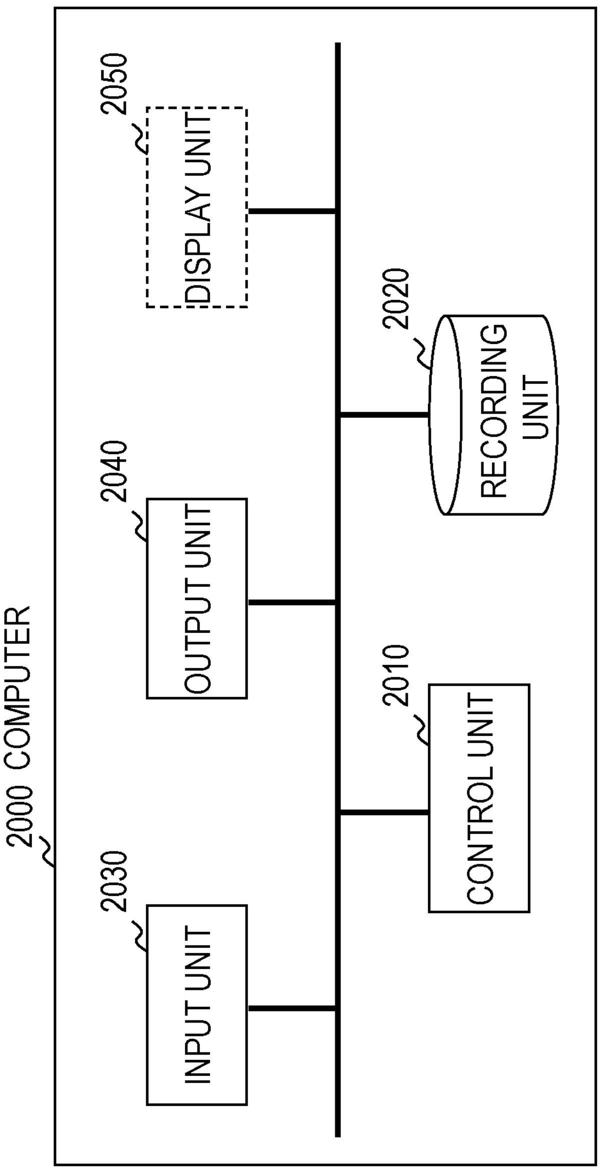
FIG. 9 is a diagram illustrating an example of a functional configuration of a computer realizing each device according to an embodiment of the present invention.

FIG. 9 is a diagram illustrating an example of a functional configuration of a computer 2000 that realizes each of the above-described devices. The processing in each of the above-described devices can be performed by reading a program that causes the computer 2000 to function as each of the above-described devices to a recording unit 2020, and causing a control unit 2010, an input unit 2030, an output unit 2040, and the like to operate.

The device according to the present invention includes, for example, as single hardware entity, an input unit to which a keyboard or the like can be connected, an output unit to which a liquid crystal display or the like can be connected, a communication unit to which a communication device (for example, a communication cable) capable of communicating with the outside of the hardware entity can be connected, a CPU (Central Processing Unit, which may include a cache memory and a register), a RAM or a ROM that is a memory, an external storage device that is a hard disk, and a bus connected for data exchange with the input unit, the output unit, the communication unit, the CPU, the RAM, the ROM, and the external storage device. Also, as necessary, the hardware entity may be provided with a device (drive) or the like capable of reading and writing data from and in a recording medium such as a CD-ROM. An example of a physical entity including such hardware resources is a general-purpose computer.

A program required to implement the above-described functions, data required to process the program, and the like are stored in an external storage device of the hardware entity (the present invention is not limited to an external storage device and, for example, the program may be stored in a ROM which is a storage device dedicated to read the program). Data or the like obtained by processing the program is appropriately stored in a RAM, an external storage device, or the like.

In the hardware entity, each program stored in an external storage device (or a ROM or the like) and data necessary for processing each program are read to a memory as necessary, and interpreted, executed, and processed by the CPU as appropriate. As a result, the CPU implements predetermined functions (the constituent units described above as units, means, and the like).

The present invention is not limited to the above-described embodiments, and changes can be made appropriately without departing from the spirit of the present invention. The processes described in the foregoing embodiments are not only executed in time series in the described order, but also may be executed in parallel or individually in accordance with a processing capability of a device that executes the processes or as necessary.

As described above, when a processing function in the hardware entity (the device according to the present invention) described in the above-described embodiments is implemented by a computer, processing content of the function included in the hardware entity is described by the program. By executing this program on the computer, the processing function in the above-described hardware entity is implemented on the computer.

A program describing this processing content can be recorded on a computer-readable recording medium. Examples of the computer-readable recording medium may include any recording medium such as a magnetic recording device, an optical disc, a magneto-optical recording medium, and a semiconductor memory. Specifically, for example, a hard disk device, a flexible disk, or a magnetic tape can be used as the magnetic recording device, a DVD (Digital Versatile Disc), a DVD-RAM (Random Access Memory), a CD-ROM (Compact Disc Read Only Memory), or a CD-R (Recordable)/RW (ReWritable) or the like can be used as the optical disk, an MO (Magneto-Optical disc) or the like can be used as the magneto-optical recording medium, and an EEP-ROM (Electronically Erasable and Programmable-Read Only Memory) or the like can be used as the semiconductor memory.

The program is distributed, for example, by sales, transfer, or lending of a portable recording medium such as a DVD or a CD-ROM on which the program is recorded. Further, the program may be distributed by storing the program in advance in a storage device of a server computer and transferring the program from the server computer to another computer via a network.

The computer that executes such a program first temporarily stores, for example, the program recorded on the portable recording medium or the program transferred from the server computer in a storage device of the computer. When the computer executes the processing, the computer reads the program stored in the storage device of the computer and executes processing according to the read program. Further, as another embodiment of the program, the computer may directly read the program from the portable recording medium and execute processing according to the program, and further, processing according to a received program may be sequentially executed whenever the program is transferred from the server computer to the computer. Instead of transferring the program from a server computer to the computer, the above-described processing may be executed by a so-called ASP (Application Service Provider) type service in which a processing function is implemented with execution commands and result acquisition alone. The program in this embodiment includes information to be provided for processing by a computer and equivalent to a program (data which is not a direct command to the computer but has a property that regulates the processing of the computer and the like).

Although the hardware entity is configured by executing a predetermined program on the computer in the present embodiment, at least a part of the processing content of the hardware entity may be implemented in hardware.

The above description of the embodiments of the present invention is presented for the purpose of illustration and description. There is no intention to be exhaustive and there is no intention to limit the invention to a disclosed exact form. Modifications or variations are possible from the above-described teachings. The embodiments are selectively represented in order to provide the best illustration of the principle of the present invention and in order for those skilled in the art to be able to use the present invention in various embodiments and with various modifications so that the present invention is appropriate for deliberated practical use. All of such modifications or variations are within the scope of the present invention defined by the appended claims interpreted according to a width given fairly, legally and impartially.

The invention claimed is:

1. A masking device comprising:

a spoken voice volume evaluation circuitry configured to generate an evaluation value for a volume of a spoken voice (hereinafter referred to as a spoken voice volume evaluation value) from a spoken voice signal by using, as the spoken voice signal, a sound collection signal output by a microphone installed for collecting the spoken voice which is a voice of a speaking person;

a masking sound signal generation circuitry configured to generate a signal for emitting a masking sound from a speaker (hereinafter referred to as a masking sound signal) corresponding to the spoken voice volume evaluation value, the masking sound preventing the spoken voice from being heard by surrounding persons other than the speaking person; and a masking video signal generation circuitry configured to generate a signal for presenting a video corresponding to the masking sound (hereinafter referred to as a masking video signal) from a video presentation device, wherein the masking sound signal generation circuitry selects a masking sound signal with a small volume when the spoken voice volume elevation value is a value indicating that the spoken voice volume is small, and a masking sound signal with a large volume when the spoken voice volume evaluation value is a value indicating that the spoken voice volume is large, from among multiple masking sound signals recorded in the recording circuitry, and the masking video signal generation circuitry selects the masking video signal using meta-information of the masking sound signal.

2. The masking device according to claim 1, further comprising:

a masking sound erasing circuitry configured to generate a signal in which a component caused by the masking sound included in the sound collection signal is erased by using the sound collection signal and the masking sound signal, and to use the signal as the spoken voice signal.

3. A masking device comprising:

a microphone array processing circuitry configured to generate an integrated sound collection signal from N (where N is an integer of 2 or more) sound collection signals output by a microphone array including N microphones installed for collecting a spoken voice that is a voice of a speaking person and to set the integrated sound collection signal as a spoken voice signal;

a spoken voice volume evaluation circuitry configured to generate an evaluation value for a volume of the spoken voice (hereinafter referred to as a spoken voice volume evaluation value) from the spoken voice signal;

a masking sound signal generation circuitry configured to generate a signal for emitting a masking sound (hereinafter referred to as a masking sound signal) corresponding to the spoken voice volume evaluation value from a speaker array including M (where M is an integer of 2 or more) speakers, the masking sound preventing the spoken voice from being heard by surrounding persons other than the speaking person;

a masking video signal generation circuitry configured to generate a signal for presenting a video corresponding to the masking sound (hereinafter referred to as a masking video signal) from a video presentation device; and a speaker array processing circuitry configured to generate M individual masking sound signals for emitting sound from the speakers included in the speaker array from the masking sound signal, wherein the masking sound signal generation circuitry selects a masking sound signal with a small volume when the spoken voice volume evaluation value is a value indicating that the spoken voice volume is small, and a masking sound signal with a large volume when the spoken voice volume evaluation value is a value indicating that the spoken voice volume is large, from among multiple masking sound signals recorded in the recording circuitry, and the masking video signal generation circuitry selects the masking video signal using meta-information of the masking sound signal.

4. The masking device according to claim 3, further comprising:

a masking sound erasing circuitry configured to generate a signal in which a component caused by the masking sound included in the integrated sound collection signal is erased by using the integrated sound collection signal and the masking sound signal, and to use the signal as the spoken voice signal.

5. A masking device comprising:

a microphone array processing circuitry configured to generate an integrated sound collection signal from N (where N is an integer of 2 or more) sound collection signals output by a microphone array including N microphones installed for collecting a spoken voice that is a voice of a speaking person and to set the integrated sound collection signal as a spoken voice signal;

a spoken voice volume evaluation circuitry configured to generate an evaluation value for a volume of the spoken voice (hereinafter referred to as a spoken voice volume evaluation value) from the spoken voice signal;

a masking sound signal generation circuitry configured to generate a signal for emitting a masking sound (hereinafter referred to as a masking sound signal) corresponding to the spoken voice volume evaluation value from a speaker array including M (where M is an integer of 2 or more) speakers, the masking sound preventing the spoken voice from being heard by surrounding persons other than the speaking person; and a speaker array processing circuitry configured to generates M individual masking sound signals for emitting sound from the speakers included in the speaker array from the masking sound signal, wherein, of the M individual masking sound signals, an individual masking sound signal directed to a direction of the speaking person is a signal such that the higher the spoken voice volume evaluation value indicates, the greater the sound emitted by the signal is and, the masking sound signal generation circuitry selects a masking sound signal with a small volume when the spoken voice volume evaluation value is a value indicating that the spoken voice volume is small, and a masking sound signal with a large volume when the spoken voice volume evaluation value is a value indicating that the spoken voice volume is large, from among multiple masking sound signals recorded in the recording circuitry.

6. A masking method comprising:

a spoken voice volume evaluation step of generating, by a masking device, an evaluation value for a volume of a spoken voice (hereinafter referred to as a spoken voice volume evaluation value) from a spoken voice signal by using, as the spoken voice signal, a sound collection signal output by a microphone installed for collecting the spoken voice which is a voice of a speaking person;

a masking sound signal generation step of generating, by the masking device, a signal for emitting a masking sound from a speaker (hereinafter referred to as a masking sound signal) corresponding to the spoken voice volume evaluation value, the masking sound preventing the spoken voice from being heard by surrounding persons other than the speaking person; and a masking video signal generation step of generating, by the masking device, a signal for presenting a video corresponding to the masking sound (hereinafter referred to as a masking video signal) from a video presentation device, wherein, in the masking sound signal generation step, the masking device selects a masking sound signal with a small volume when the spoken voice volume evaluation value is a value indicating that the spoken voice volume is small, and a masking sound signal with a large volume when the spoken voice volume evaluation value is a value indicating that the spoken voice volume is large, from among multiple masking sound signals recorded in the recording circuitry, and in the masking video signal generation step, the masking device selects the masking video signal using meta-information of the masking sound signal.

7. A masking method comprising:

a microphone array processing step of generating, by a masking device, an integrated sound collection signal from N (where N is an integer of 2 or more) sound collection signals output by a microphone array including N microphones installed for collecting a spoken voice that is a voice of a speaking person and to set the integrated sound collection signal as a spoken voice signal;

a spoken voice volume evaluation step of generating, by the masking device, an evaluation value for a volume of the spoken voice (hereinafter referred to as a spoken voice volume evaluation value) from the spoken voice signal;

a masking sound signal generation step of generating, by the masking device, a signal for emitting a masking sound (hereinafter referred to as a masking sound signal) corresponding to the spoken voice volume evaluation value from a speaker array including M (where M is an integer of 2 or more) speakers, the masking sound preventing the spoken voice from being heard by surrounding persons other than the speaking person;

a masking video signal generation step of generating, by the masking device, a signal for presenting a video corresponding to the masking sound (hereinafter referred to as a masking video signal) from a video presentation device; and a speaker array processing step of generating, by the masking device, M individual masking sound signals for emitting sound from the speakers included in the speaker array from the masking sound signal, wherein, in the masking sound signal generation step, the masking device selects a masking sound signal with a small volume when the spoken voice volume evaluation value is a value indicating that the spoken voice volume is small, and a masking sound signal with a large volume when the spoken voice volume evaluation value is a value indicating that the spoken voice volume is large, from among multiple masking sound signals recorded in the recording circuitry, and in the masking video signal generation step, the masking device selects the masking video signal using meta-information of the masking sound signal.

8. A non-transitory computer-readable recording medium recording a program causing a computer to function as the masking device according to claim 1.

9. A non-transitory computer-readable recording medium recording a program causing a computer to function as the masking device according to claim 3.

* * * * *